(No Model.)   11 Sheets—Sheet 2.

W. E. WILLIAMS.
MACHINE FOR CUTTING AND STICKING MATCH SPLINTS.

No. 555,987.   Patented Mar. 10, 1896.

Witnesses
Fred. Borg
Frank Murphy

Inventor
W. E. Williams

Fig. 4.

(No Model.)    W. E. WILLIAMS.    11 Sheets—Sheet 5.
MACHINE FOR CUTTING AND STICKING MATCH SPLINTS.

No. 555,987.    Patented Mar. 10, 1896.

Fig. 5.

Witnesses
Fred Borg
Frank R. Murphy

Inventor
W. E. Williams (No Model.) 11 Sheets—Sheet 6.
W. E. WILLIAMS.
MACHINE FOR CUTTING AND STICKING MATCH SPLINTS.
No. 555,987. Patented Mar. 10, 1896.

Fig. 6.

Witnesses
Fred. Borg.
Frank Murphy.

Inventor
W. E. Williams (No Model.) 11 Sheets—Sheet 7.

W. E. WILLIAMS.
MACHINE FOR CUTTING AND STICKING MATCH SPLINTS.

No. 555,987. Patented Mar. 10, 1896.

Witnesses
Fred Borg
Frank Murphy

Inventor
W. E. Williams (No Model.) 11 Sheets—Sheet 8.

W. E. WILLIAMS.
MACHINE FOR CUTTING AND STICKING MATCH SPLINTS.

No. 555,987. Patented Mar. 10, 1896.

Witnesses
Fred. Borg.
Frank Murphy.

Inventor (No Model.) 11 Sheets—Sheet 9.
W. E. WILLIAMS.
MACHINE FOR CUTTING AND STICKING MATCH SPLINTS.
No. 555,987. Patented Mar. 10, 1896.

Witnesses
Fred Borg.
Frank Murphy.

Inventor
W. E. Williams (No Model.) 11 Sheets—Sheet 10.

W. E. WILLIAMS.
MACHINE FOR CUTTING AND STICKING MATCH SPLINTS.

No. 555,987. Patented Mar. 10, 1896.

Witnesses
Fred Borg
Frank Murphy

Inventor
W. E. Williams

UNITED STATES PATENT OFFICE.

WILLIAM ERASTUS WILLIAMS, OF CHICAGO, ILLINOIS.

MACHINE FOR CUTTING AND STICKING MATCH-SPLINTS.

SPECIFICATION forming part of Letters Patent No. 555,987, dated March 10, 1896.

Application filed March 8, 1895. Serial No. 540,953. (No model.)

*To all whom it may concern:*

Be it known that I, WILLIAM ERASTUS WILLIAMS, a citizen of the United States, residing at Chicago, in the county of Cook and State of Illinois, have invented new and useful Improvements in Machines for Cutting and Sticking Match-Splints, of which the following is a specification.

My invention relates to the well-known class of machines for cutting match-splints and sticking them into metallic plates provided with holes slightly smaller than the splints to be stuck therein, and its object is to improve both the general construction and the specific details of such machines.

In the accompanying drawings, the line of sight for each view is indicated, so far as is practicable, by an arrow near some other figure and numbered to correspond with the view to which it relates.

Figure 24:
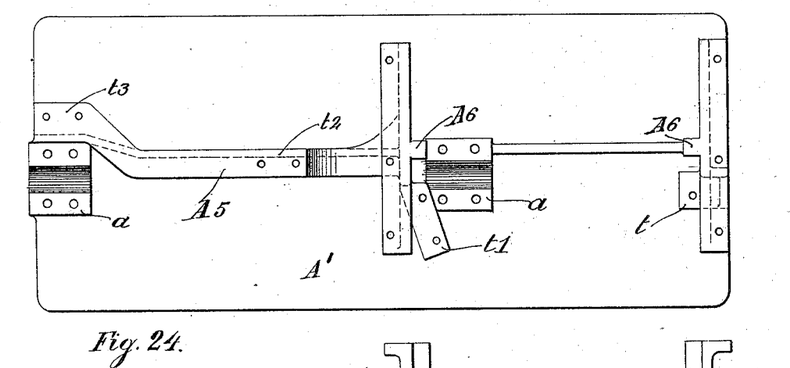
Figs. 24, 25 and 26 are respectively plan, side, and sectional views of the one-piece cast frame of the machine.
Figure 25:
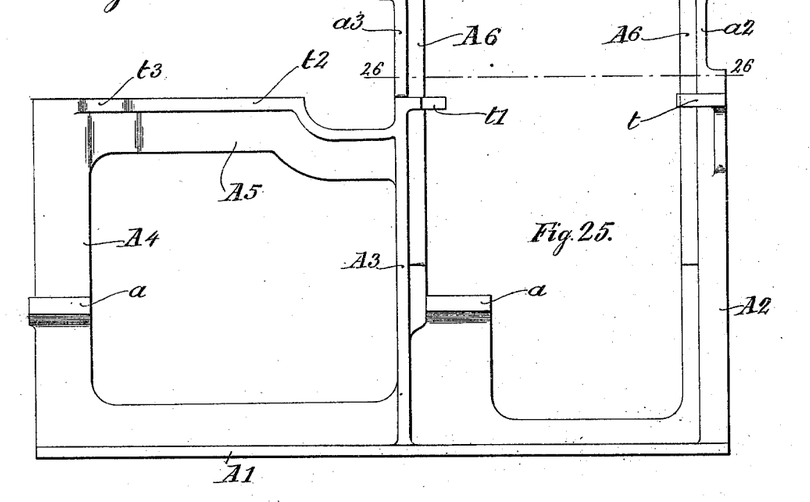
Figure 26:
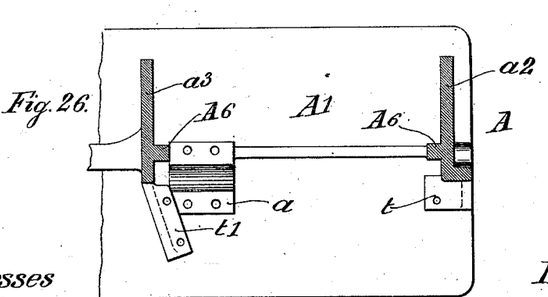
Figures 27, 28, 29, 30, 31:
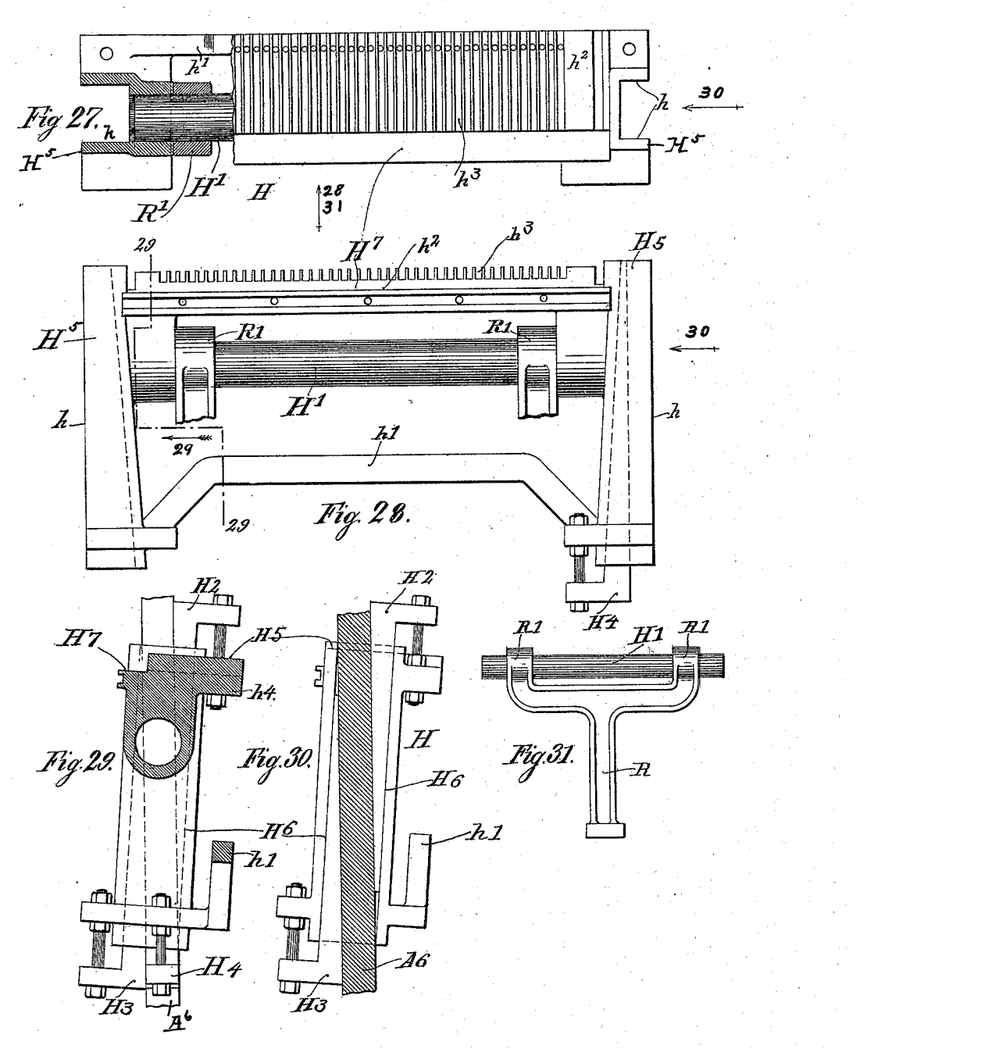
Figs. 27, 28, 29 and 30 are respectively plan, front, side, and end views of the cutter-bearing cross-head.
Fig. 31 shows in side view a forked pitman which carries said cross-head.

In the figures, A' is a bed-plate and $A^2$ $A^3$ $A^4$ $A^5$ $A^6$ are central vertical and horizontal members cast integrally with the bed-plate and provided with various flanges and projections to support the remaining parts of the machine. In general form this frame is a rectangular base-plate having no marginal posts whatever, but provided with a longitudinal central partition or wall and with two short cross-walls which extend symmetrically upon opposite sides of the main wall, a construction which not only reduces the weight to a minimum, but permits placing all the strain-exerting parts in or very nearly in the plane of one of the walls, and so arranging them that all the heavy strains must be in these planes; and as such a machine is run at a high speed and must at all times act with almost absolute accuracy to do good work this is a matter of no little importance, and hence the frame is shown entirely without other parts in Figs. 24, 25 and 26.

Upon flanges $t$ $t'$ $t^2$ $t^3$ at the top of the main portions of the main and cross walls is bolted a stock-trough T, shown as containing a stock-block D, and above this trough a top plate P is bolted to upward extensions $a^2$ $a^3$ of the cross-walls and adjacent parts of the main wall. The machine is driven from any suitable source of power by a main shaft S mounted alongside the main wall in brackets $a$ and bearing at its outer end a fly-wheel pulley F and a loose pulley F', and at its inner end, which projects a little beyond the first cross-wall, a counterbalanced crank-plate C', provided with a wrist-pin C for actuating certain reciprocating parts hereinafter described.

Figure 6:
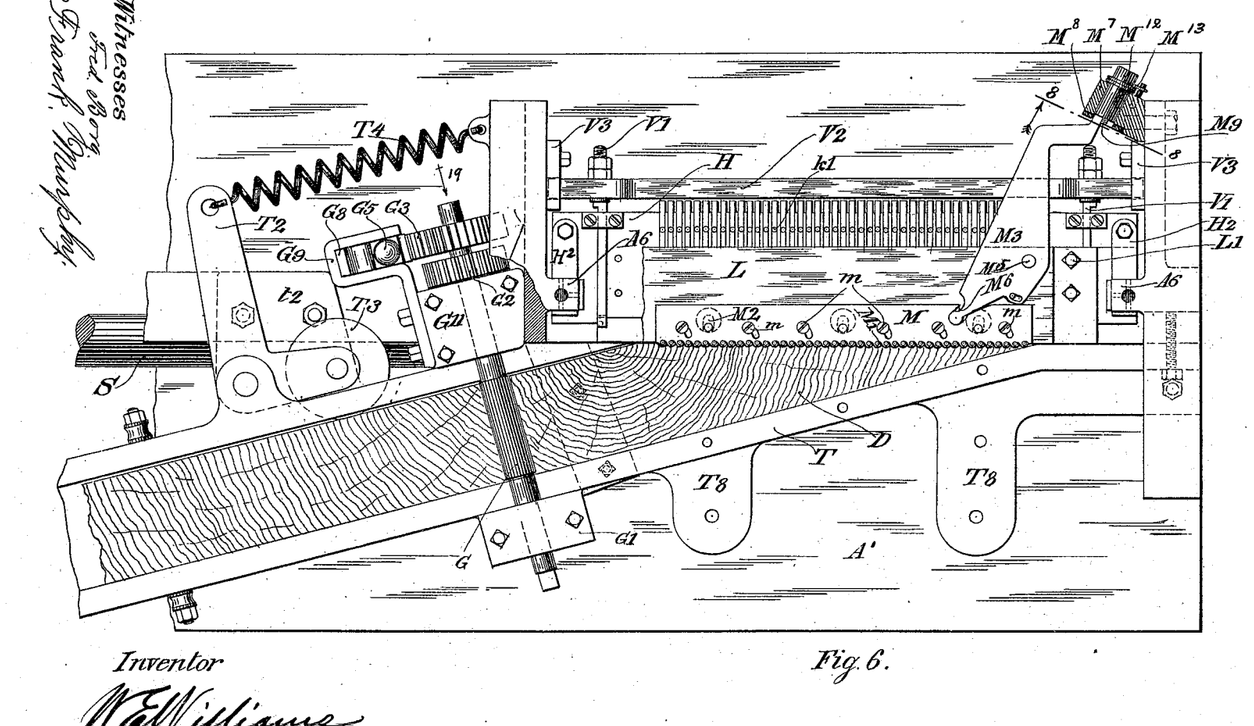
Fig. 6 is a partial plan of the machine with the top plate removed to show a splint-holding plate engaging the set of splints.
Figures 17, 18, 19:
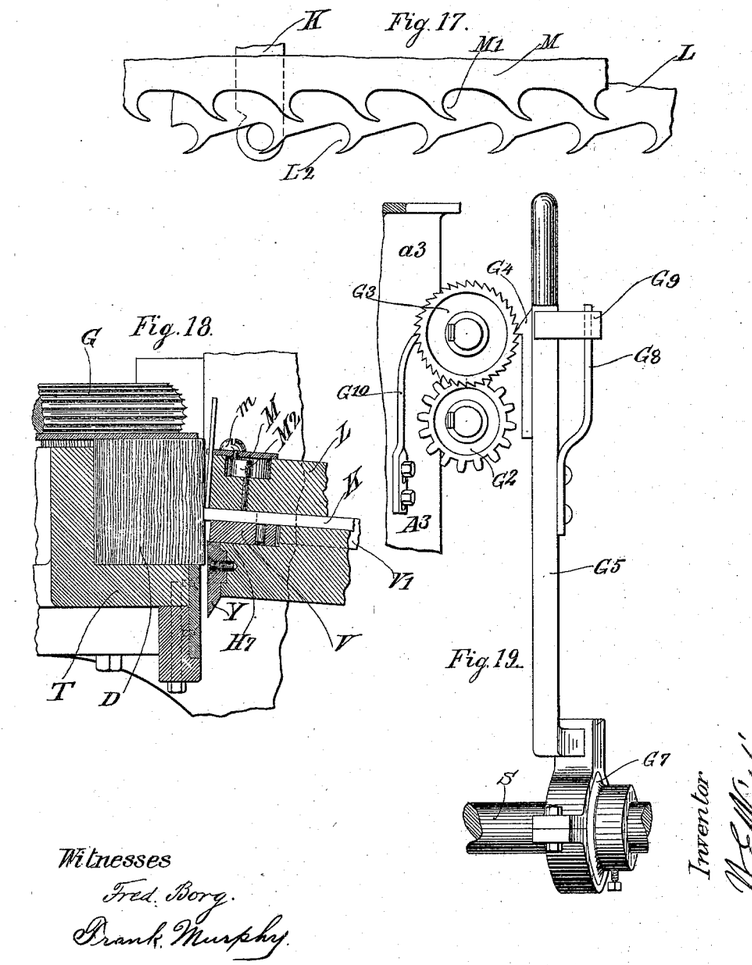
Fig. 17 is a like view showing the plate out of action.
Fig. 18 shows the relative positions of the block and cutter-head when the latter is moving upward to stick a set of splints.
Fig. 19 shows the feed-roller, ratchet-wheel and pawls, the line of sight being in the direction of the arrow 19 of Fig. 1.
Figure 20:
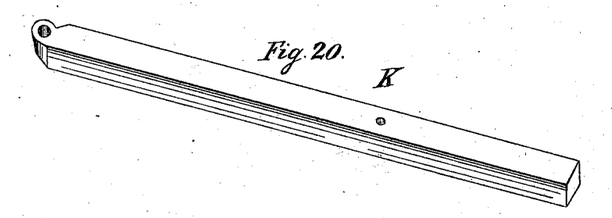
Fig. 20 represents one of the cutters detached.

The blocks D are fed obliquely toward a splint-cutter by a pair of corrugated rollers G connected by gears $G^2$ and driven from the main shaft S by devices best shown in Figs. 6 and 19. Upon the shaft of one roller G is fixed a ratchet-wheel $G^3$, and this is intermittently rotated by a pawl $G^4$ fixed to a bar $G^5$, which is carried up and down by an eccentric $G^7$ upon the shaft S. The bar $G^5$ slides both vertically and horizontally in a guide $G^9$ and is pressed toward the ratchet-wheel by a spring $G^8$ reacting against the guide. Counter-revolution of the ratchet-wheel is prevented by a spring stop-pawl $G^{10}$, which may be adjusted vertically when the ratchet-wheel is changed for different rates of feed.

Figure 2:
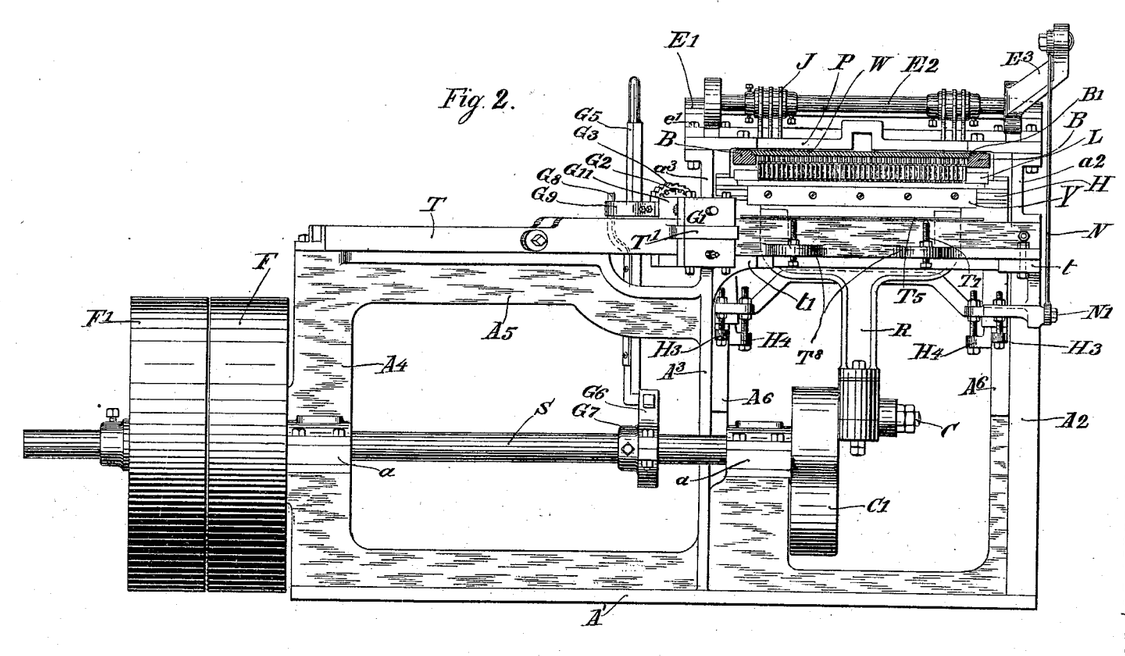
Figure 3:
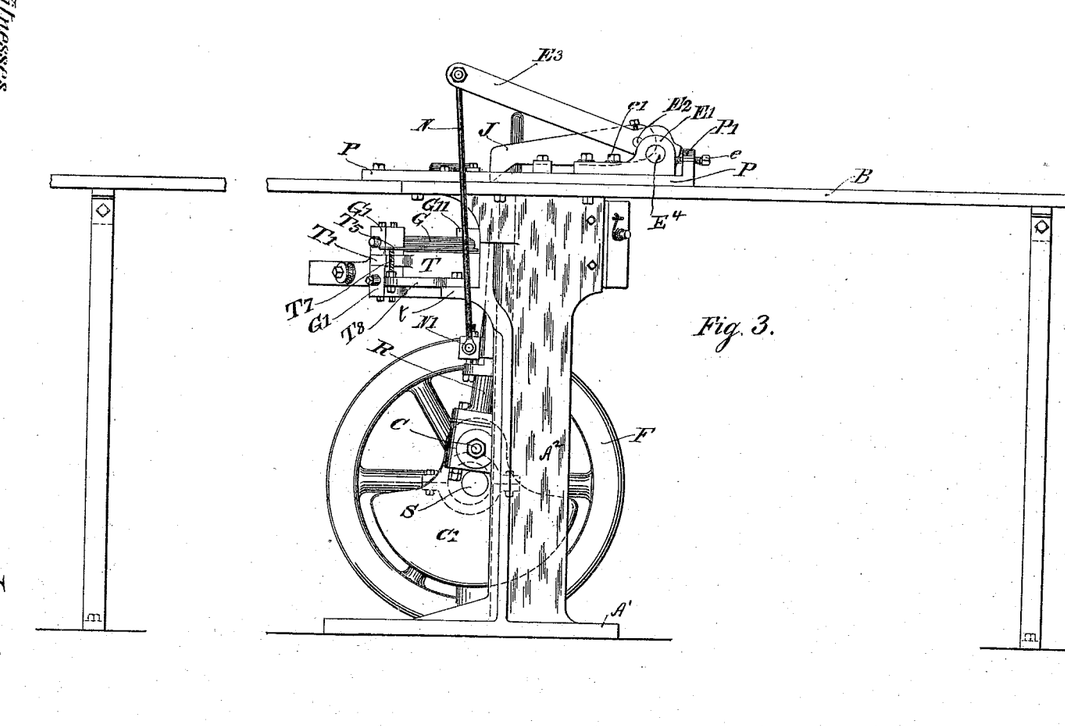

The stock D is held against the outer wall of its trough by a spring $T^4$ acting through a bell-crank lever $T^2$ and a roller $T^3$, which projects inward through the trough-wall. At the inner end of the trough the stock is held down with adjustable pressure by a spring-steel plate $T^5$, Figs. 2, 4, and 5, centrally held to one edge of the trough by screws $T^6$. To increase its pressure, the plate is rocked upon an axis passing through the screws $T^6$ by raising set-screws $T^7$ working under its outer portion in lugs $T^8$ upon the outside of the trough.

Figure 1:
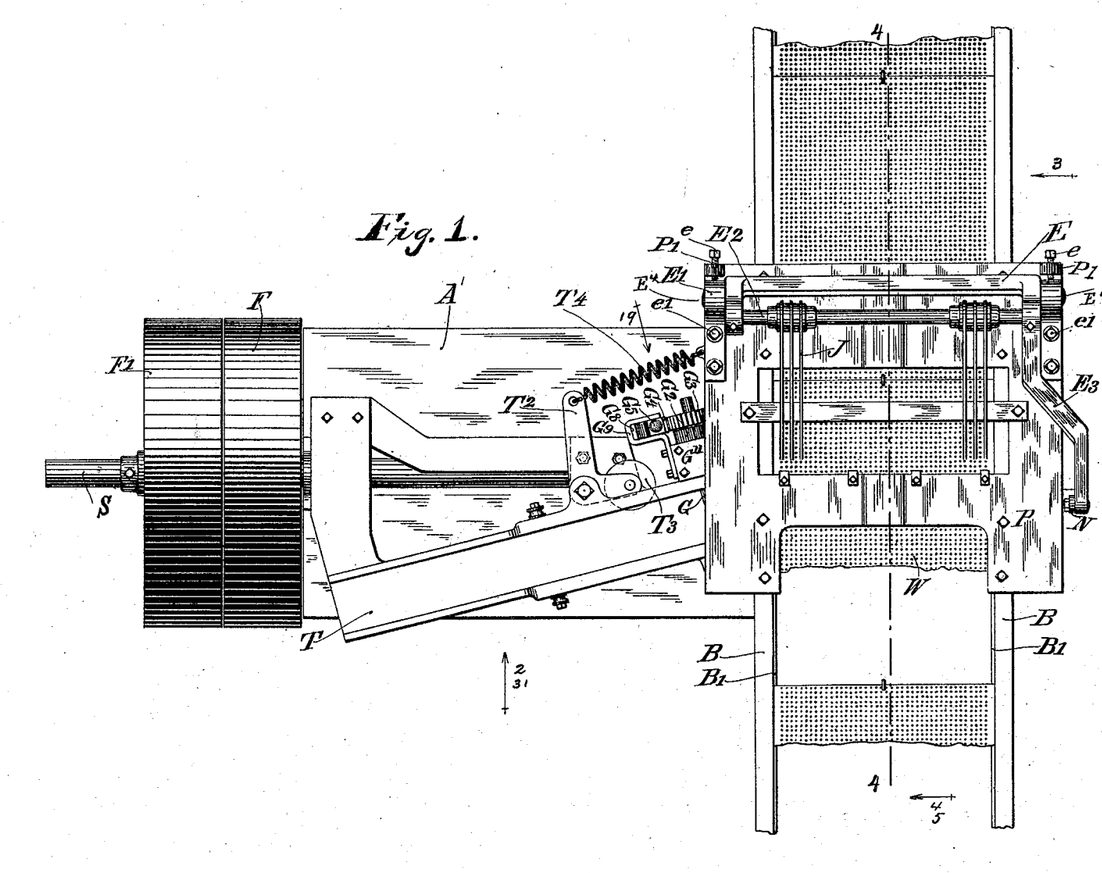
Figures 1, 2 and 3 are respectively plan, side, and end views of the machine.
Figure 4:
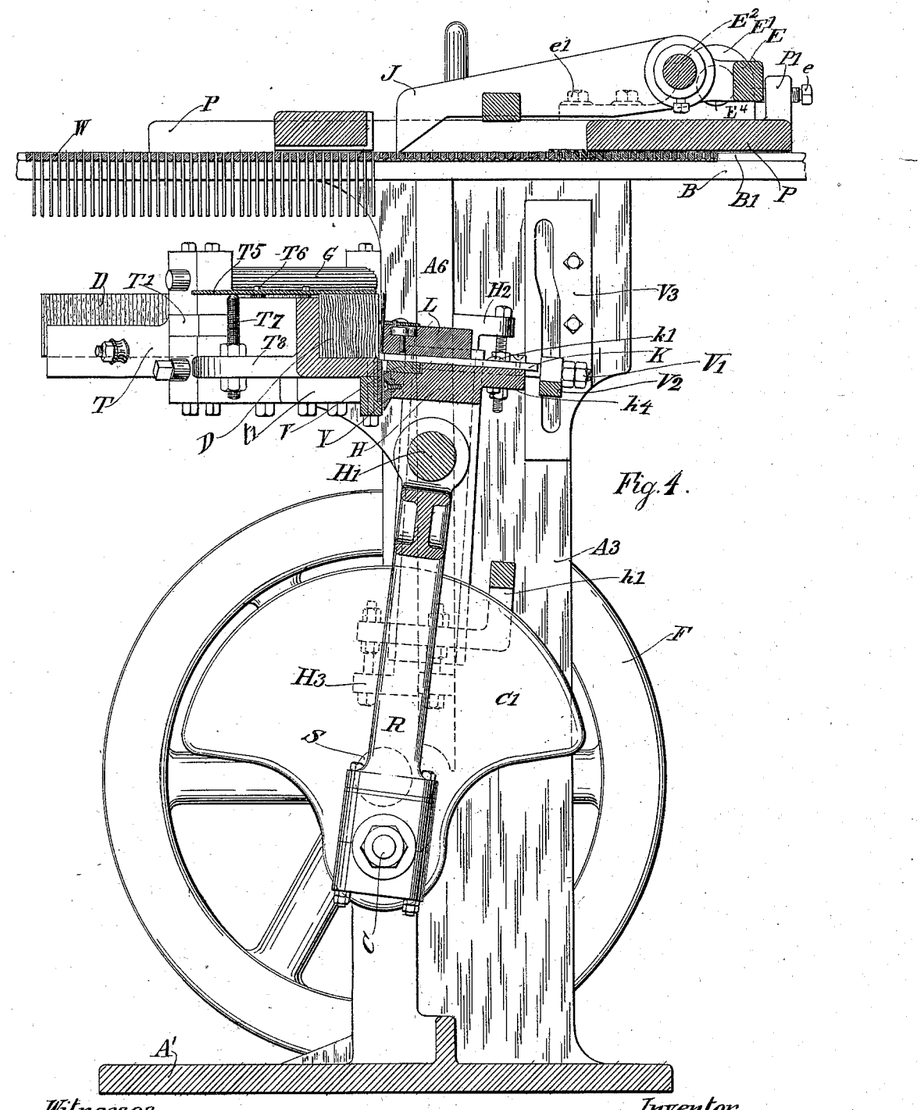
Fig. 4 is a section on the line 4 4, Fig. 1, the parts being shown in the positions they have at the completion of the cutting of a set of splints.
Figure 5:
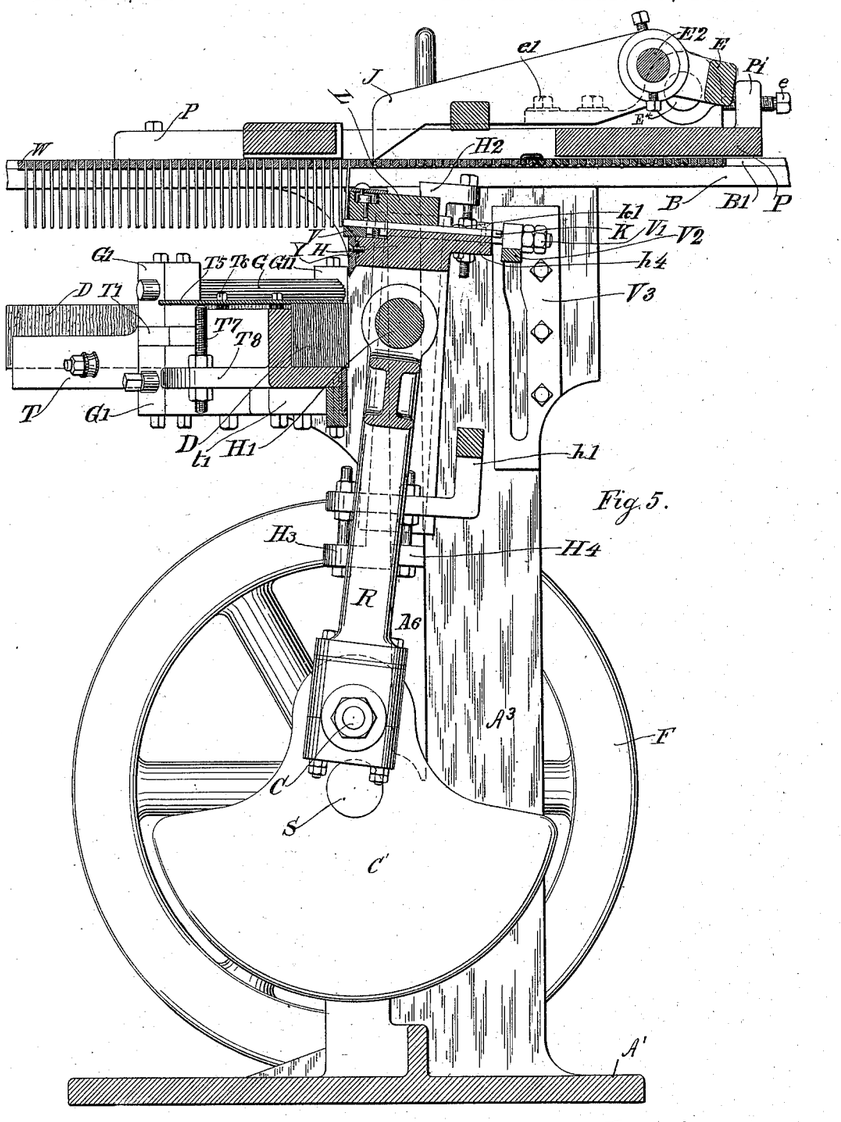
Fig. 5 is a view similar to the last, except that the parts are in the positions that they occupy at the instant when the sticking of the set of splints has been completed.

The rack into which the splints are to be stuck from below is a perforated metal plate W, Figs. 1, 4, and 5, sliding in ways B' in bars B rigidly secured to the under side of the plate P at some distance above the working face or end of the stock D. At the proper intervals it is advanced precisely the distance between its ranks of perforations by arms J, Figs. 1, 2, 3, 4, and 5, whose points normally engage in the perforations and whose other ends are loosely mounted between collars upon a transverse shaft $E^2$ fixed in a frame E, which rocks upon gudgeons $E^4$ not in line with the axis of the shaft $E^2$. The bearings E' of the gudgeons are secured to the plate P by screws $e'$ passing through slotted holes, and the whole device is adjusted in position by set-screws $e$ working in lugs P' upon the plate P against the bearings E', and thereby the points of the arms J, and consequently the rank of engaged holes in the rack, may be brought very exactly to the desired point. One side of the frame E is extended to form an arm $E^3$, and the free end of this arm is connected by a link N to a cross-head by whose motion the frame is rocked upon its gudgeons. Evidently the proper rocking of the frame carries the shaft $E^2$ bodily upward and about the gudgeons, and thus draws the arms J rearward until their points fall into a new rank of perforations, and the return of the frame to its initial position advances this new rank to precisely the line before occupied by the preceding rank.

The splints are cut from the end face of the block D and stuck in the plate W by devices yet to be described. Between the cross-walls of the frame the main wall is largely cut away so as to leave along the inner face of each cross-wall a vertical rib $A^6$, which extends to the plate P and is in its upper part somewhat thickened. These ribs serve as guides for a cutter-bearing cross-head H, (see Figs. 27, 28, 29, 30, and 31,) which is in general terms a light rectangular frame consisting of vertical members $H^5$, grooved at $h$ to pass over the guide-ribs $A^6$, and connected above and below by integral horizontal members $h^2$ $h'$, and between these by a shaft H', which is encircled near its ends by the ends R' of a forked pitman R, carried by the wrist-pin C, already mentioned. The grooves $h$ are wide and deep enough to receive alongside the ribs $A^6$ screw-adjusted wedge-gibs $H^2$ $H^3$ $H^4$, which work against the three faces of the ribs. The gibs $H^2$ $H^3$ are put in upon opposite sides of the ribs, so that the whole cross-head, although made without oblique angles, has its upper part slightly inclined away from the work.

Figure 21:
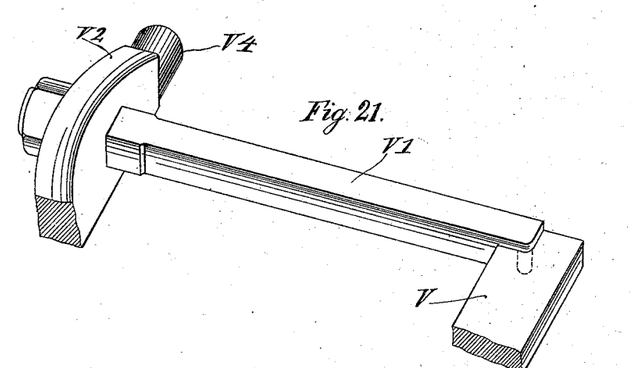
Figs. 21, 22 and 23 are detail views of a splint-abutting bar and parts for actuating the same.
Figures 22, 23:
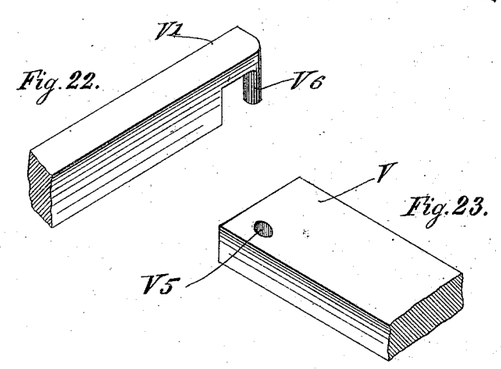

The frame is given a considerable vertical width to obtain greater rigidity, diminish wear and to insure its moving exactly parallel to itself. These latter objects are further promoted by using the forked pitman to seize the cross-head near its ends and thus prevent the racking strains that would otherwise occur when the cutting is at one end only of the frame—a condition which often arises. The upper member, $h^2$, of the frame has transverse grooves $h^3$ to receive cutters K, which are held in place by screws $k'$ passing down into a flange $h^4$ of the frame. (See Figs. 4 and 5.) In the front edge of the upper member is a groove $H^7$, Figs. 18, 27, 28, and 29, in which slides a splint-sticking bar V, Figs. 3, 4, 5, 6, 21, and 23, connected by parallel end rods V' to a bar $V^2$, whose ends slide in cam-like ways in plates $V^3$ fixed to the adjacent end walls of the frame, as shown in Figs. 5 and 6. As the head rises and falls the bar is forced to slide laterally by the grooves, and these are so formed and placed that at the proper time the bar is pushed under the ends of the set of splints cut in the last descent of the cross-head, and, abutting against this bar, they are forced into perforations in the rack-plate W as the ascending head reaches or approaches its upper limit of movement. On the return of the head the grooves or slots withdraw the bar before the block D is reached. The connection between the bar and the rods V' is seen in Figs. 21, 22, and 23, the rods being provided with studs $V^6$, which drop into holes $V^5$ in the ends of the bar and are held in place by a bar L bolted to the cross-head at L'. In the front edge of the bar L, which also retains the cutters K, is a series of grooves $L^2$, which form semi-cylindrical hooks, Figs. 17 and 18. The grooves register exactly with the cutters below and receive the splints as they are formed by the cutters.

Figure 7:
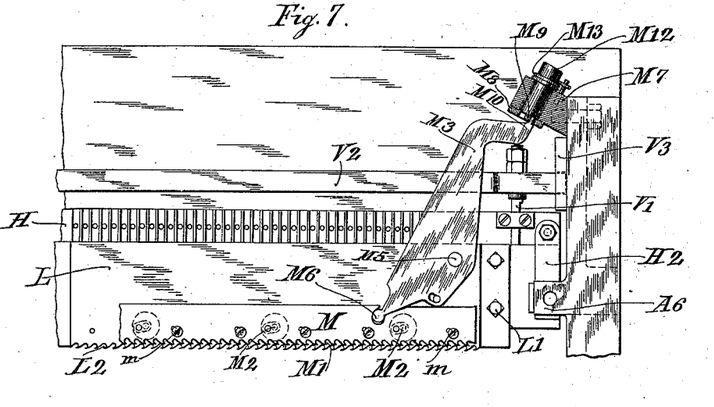
Fig. 7 is a view similar to the last, but with the splint-holding plate out of action.
Figure 8:
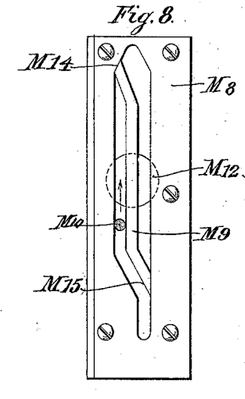
Figs. 8, 9, 10, 11, 12, 13, 14 and 15 are details relating to devices for actuating the splint-holding plate.
Figure 9:
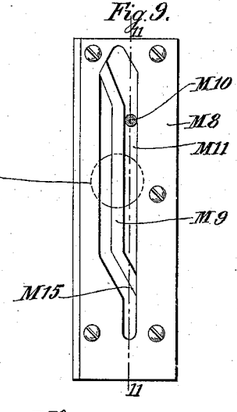
Figure 10:
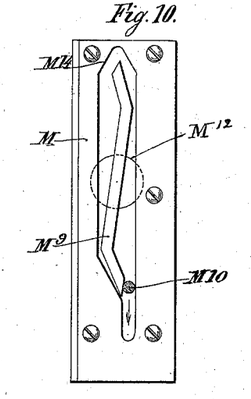
Figures 11, 12, 13:
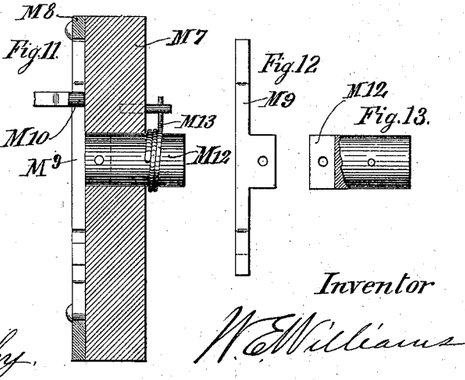
Figure 14:
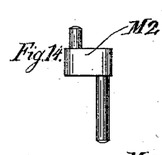
Figure 15:
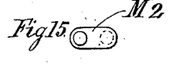
Figure 16:
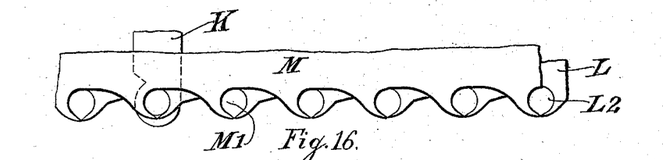
Fig. 16 shows a portion of the splint-holding plate in the position of coacting with a grooved bar below it to hold a set of splints.

Upon the top of the bar L is a thin splint-clamping plate M, having in its front side a series of hooks similar to those in the bar, but reversed in position. This plate is held in sliding contact with the bar by screws $m$, Figs. 6, 7, and 18, and is moved by a lever $M^3$, centrally pivoted at $M^5$ to the bar L, and with its inner end working in a rounded socket $M^6$ in the plate. The lever is of course carried bodily with the cross-head, and as it rises and falls it is caused to vibrate laterally upon the pivot $M^5$ by means of the devices shown in Figs. 7, 8, 9, 10, 11, and 12, wherein $M^7$ represents a vertical rib of the main frame and $M^8$ a slotted plate thereon to receive the outer end $M^{10}$ of the lever. The slot is much wider than the lever end, and is divided by a movable vertical partition M⁹, having its end portions inclined, respectively, toward opposite walls of the slot. The partition is carried upon a central rocking pivot M¹², and its inclined end portions are normally held against opposite walls of the slot by a spring M¹³, acting upon the pivot and reacting against the rib M⁷. The arrangement is such that as the cross-head descends the lever end passes vertically down the part M¹¹, pushing aside the inclined end of the partition without itself deviating from its course. As the cross-head rises, the lever end begins to return in the same path; but at M¹⁵ it meets again the same inclined end which the spring instantly returned to place after the passing of the downwardly-moving lever end and is forced over to the opposite side of the slot. This swings the lever upon its pivot and thus slides the plate M; but the motion of the plate M is modified by directing devices shown in Figs. 7, 14, and 15. Two or more duplicate mechanisms are employed, and each consists of a short bar M², sunk in a circular recess in the bar L, and having one of its ends pivoted to the bar and the other to the plate M above. The latter then in sliding longitudinally is forced to move laterally through a distance fixed by the eccentricity of the two pivots, and the initial and final positions of the bar M² are such that the plate receives a motion compounded of a lateral movement gradually decreasing in speed and a longitudinal movement gradually increasing in speed. From the construction described it follows that when in the upward movement of the cross-head the lever end M is deflected at M¹⁵, Fig. 8, the hooks M′, Fig. 17, moving in a curve, sweep in between the splints and clamp them, respectively, as suggested in Fig. 16, and so hold them until the continued rise of the cross-head carries the lever end to the point M¹⁴, where as it pushes aside and passes the end of the partition it is deflected by the inclined wall of the slot and thus causes a reverse movement of the plate M and releases the splints; but meantime they have been forced into the holes in the rack by the pressure of the bar V against which they abut. As the head now descends, it draws down the link N, pivoted to its side at N′, and thus the frame E, and feeds the rack forward, as already described. The head carries, just below the cutters, a knife Y which cuts away any projections upon the block K and leaves a clean face for the operation of the descending cutters.

The inclination of the cross-head is a simple expedient for obtaining certain old results that are very desirable, certain new results, and certain novel advantages of considerable practical importance. In the perforated cutters used in this class of machines the cross-section from the aperture forward and outward is necessarily V-shaped. If such aperture be parallel to the direction of the cutter's motion, the thick upper part of such V-shaped portion must at each descent form a way for itself by compressing the wood, and this results in a waste of power, undue strain and consequent increase of weight, an inferior product, and material diminution of the number of splints from given stock. The evil is wholly avoided by the inclination of the head. It may also be avoided by inclining the cutters in the head, although it is not known that such expedient has ever been resorted to where an oscillating cutter-head was employed. Were it adopted it would involve making inclined seats in the cutter-head and also making the head itself oblique-faced. Now, in order that the splints may be properly formed and stuck in the plate with certainty, it is essential that the long series of bars should be set with almost absolute exactness, and properly forming oblique seats in the head is a matter of trouble and expense. Inclining the head also throws the upper end of the splint from the stock. The same result may be obtained by inclining the cutters alone and also by drilling the cutters obliquely. The latter expedient does not avoid compression of the wood, and, besides, it is a difficult matter to drill the cutters obliquely and yet with the necessary accuracy. Inclining the head at no additional cost combines all the advantages of both the other expedients. It also depresses the rear portion of the upper face of the head and allows needed room for devices operating the mechanism for gripping each splint as it is formed, and it also allows space for inspecting the parts while in operation and places the parts in convenient position to be inspected. Practically this is important, for however carefully the parts be made and adjusted it will happen that the operator will from time to time observe imperfect results the cause of which it is usually difficult to locate.

It may be observed, in accordance with what was suggested at the outset, that the cross-head is in the plane of the main wall of the one-piece frame and that the main shaft and all the points where cutting is done are nearly so, and also that the forked pitman applies all lateral thrust in substantially the planes of the cross-walls cast integrally with the base-plate and the main wall, and hence that all the principal strains are in the planes of broad webs of cast metal. It follows that, although the machine is unusually light, we have nearly absolute rigidity. In machines of this kind the strains are great, since for various reasons it is desirable to run them at a high speed; yet rigidity is essential, for even slight displacement of the more important parts causes imperfection in cutting or in sticking, and thus throws into waste what should have been perfect splints delivered in full racks, or, in other words, wipes out the narrow margin of profit.

It will be understood without detailed statement that when the parts of the machine are properly adjusted the various movements that have been described are so timed as to occur synchronously or in proper succession, so that the machine operates continuously, repeating its operations indefinitely so long as stock and rack-plates are supplied.

What I claim is—

1. The combination with a frame provided with suitable ribs for guiding a cutter-head, of means for feeding stock in a plane perpendicular to the plane of said ribs, a reciprocating cutter-head provided with lateral grooves wider than said ribs but receiving the same, wedge-shaped gibs inserted at the corresponding ends of said grooves upon the same side of the ribs, similar gibs similarly inserted at the opposite ends of said grooves and upon the opposite side of the ribs, whereby the cutter-head is inclined to the plane of its motion, and cutters carried by said cutter-head and each having the passage for the splints which it forms substantially parallel to the plane of the inclined cutter-head.

2. The combination with devices for feeding splint-stock, of a cutter-head arranged to reciprocate across the path of the stock, cutters carried by said cutter-head and each having the passage for the splints which it forms substantially parallel to the plane of the cutter-head, and means for holding the cutter-head constantly inclined to the plane of its motion.

3. The combination with devices for feeding stock, of a cutter-head arranged to reciprocate across the path of the stock, devices arranged upon the cutter-head to clamp each splint after it is formed, and perpendicularly-perforated cutter-bars carried by the cutter-head and inclined to the cutting-plane to throw the splints forward into said clamping devices.

4. The combination with stock-feeding devices and a cutter-head provided with cutter-bars and arranged to reciprocate across the path of the stock, of a bar and a plate mounted one above the other upon the cutter-head and provided respectively, with a series of marginal splint-supporting hooks and a corresponding series of oppositely-turned hooks, and means for at intervals moving the hooks of one set toward and away from the hooks of the other set, whereby splints are clamped and released.

5. The combination with a reciprocating cutter-head bearing suitable cutter-bars, of a plate movably mounted upon the cutter-head alongside the cutting plane and provided with marginal notches adapted to support, respectively, the sides of the several splints when the plate is in proper position, means for at intervals throwing the plate into and out of such position, and means for supporting the opposite sides of the several splints.

6. The combination with a cutter-head arranged to reciprocate in a fixed path and provided with cutter-bars and with a lateral support for the same side of all the splints, of a plate mounted upon the cutter-head alongside the cutting plane and provided with hooks adapted to support, respectively the other, or opposite, sides of the several splints, and means for moving said plate both laterally to pass its hooks between the splints and longitudinally to clamp the splints against said supports, respectively.

7. The combination with stock-feeding devices and a cutter-head arranged to reciprocate across the path of the stock, of a splint-clamping device borne by the cutter-head and consisting of a superposed bar and plate having corresponding, oppositely-turned marginal hooks and connected by links each having one end pivoted to the bar and the other pivoted to the plate, and means for causing the oppositely-turned hooks to approach and recede in the path determined by said links.

8. The combination with a reciprocating cutter-head bearing splint-cutters and provided with devices for supporting one side of each splint formed by the cutters, of a sliding plate mounted upon the cutter-head and provided with marginal hooks adapted to clamp the several splints against said supporting devices, and a lever pivoted upon the cutter-head, at one end engaging said plate to slide it and at the other engaging in a suitable way in a fixed part of the machine.

9. The combination with a suitable cutter-head provided with devices for clamping the several splints of each set formed, of a slotted guide-plate fixed alongside the path of the cutter-head and having its slot divided by a spring-controlled swinging partition substantially as set forth, and a lever pivoted upon the cutter-head and having one end traveling in said slot and the other connected with said devices to operate them.

In witness whereof I have hereunto subscribed my name, on this 26th day of February, A. D. 1895, in the presence of two subscribing witnesses.

WILLIAM ERASTUS WILLIAMS.

Witnesses:
BERTHA DUPPLER,
FRED BORG.